United States Patent [19]
Kawamoto et al.

[11] Patent Number: 5,601,735
[45] Date of Patent: Feb. 11, 1997

[54] LONG-SIZED TUBULAR GROUNDING CONTAINER UNIT FOR GAS-INSULATED ELECTRICAL DEVICE AND LASER WELDING DEVICE FOR MANUFACTURING THE SAME

[75] Inventors: Hideo Kawamoto; Tokio Yamagiwa; Shinji Fukuda; Masayoshi Hashiura; Osamu Isshiki; Shigetaka Takeuchi; Masaki Murashita, all of Hitachi, Japan

[73] Assignee: Hitachi, Ltd., Tokyo, Japan

[21] Appl. No.: 45,249

[22] Filed: Apr. 13, 1993

[30] Foreign Application Priority Data

Apr. 13, 1992 [JP] Japan .................................. 4-092968
Sep. 18, 1992 [JP] Japan .................................. 4-249936

[51] Int. Cl.$^6$ .................................................. B23K 26/00
[52] U.S. Cl. .................................................. 219/121.63
[58] Field of Search ........................ 219/121.63, 121.64, 219/121.83, 121.75, 121.6, 59.1, 121.74

[56] References Cited

U.S. PATENT DOCUMENTS

| | | | |
|---|---|---|---|
| 3,892,488 | 7/1975 | Edmonds | 219/121.83 |
| 4,001,543 | 1/1977 | Bove et al. | 219/121.63 |
| 4,080,525 | 3/1978 | Gobetz | 219/121.63 |
| 4,088,865 | 5/1978 | Peters et al. | 219/121.63 |
| 4,367,017 | 1/1983 | Jimbou et al. | 219/121.79 |
| 4,429,211 | 1/1984 | Carstens et al. | 219/121.63 |
| 4,577,087 | 3/1986 | Chadwick | 219/121.63 |
| 4,684,780 | 8/1987 | Contello et al. | 219/121.74 |
| 5,147,999 | 9/1992 | Dekumbis et al. | 219/121.63 |
| 5,173,584 | 12/1992 | Kahlert et al. | 219/121.83 |
| 5,334,816 | 8/1994 | Sugiyama | 219/121.83 |

FOREIGN PATENT DOCUMENTS

| | | | |
|---|---|---|---|
| 476501 | 3/1992 | European Pat. Off. | 219/121.63 |
| 2382304 | 11/1978 | France | 219/59.1 |
| 59-1084 | 1/1984 | Japan | 219/121.81 |
| 59-104288 | 6/1984 | Japan | 219/121.78 |
| 59-189092 | 10/1984 | Japan . | |
| 59-191584 | 10/1984 | Japan . | |
| 60-174286 | 9/1985 | Japan | 219/121.14 |
| 3-9834 | 2/1991 | Japan . | |
| 3-128183 | 5/1991 | Japan . | |
| 3-226391 | 10/1991 | Japan | 219/121.78 |
| 3-285784 | 12/1991 | Japan | 219/121.78 |
| 4-127986 | 4/1992 | Japan | 219/121.6 |

*Primary Examiner*—Geoffrey S. Evans
*Attorney, Agent, or Firm*— Fay, Sharpe, Beall, Fagan, Minnich & McKee

[57] ABSTRACT

A laser welding device for welding a long sized tubular grounding unit includes a work head arranged to rotate around an outer circumference of two tubular members to be welded, a laser oscillator, and apparatus to transmit the laser beam from the oscillator in sychronism with rotation of the work head. In one embodiment the apparatus to transmit the laser beam includes an optical fiber.

9 Claims, 10 Drawing Sheets

# LONG-SIZED TUBULAR GROUNDING CONTAINER UNIT FOR GAS-INSULATED ELECTRICAL DEVICE AND LASER WELDING DEVICE FOR MANUFACTURING THE SAME

BACKGROUND OF THE INVENTION

1. Field of the Invention

The present invention relates to a long-sized tubular, usually grounding, container unit for a gas-insulated electrical device such as a gas-insulated bus and a gas-insulated switch gear device, and a laser welding device for manufacturing the same.

2. Description of the Related Art

A gas-insulated electrical device which is known, such as a gas-insulated bus and a gas-insulated switch gear device, generally comprises a grounding container filled with an insulating gas, such as $SF_6$ gas, and a conductor supplied with a predetermined potential and disposed in the grounding container while being electrically insulated therefrom.

An example of a conventional grounding container for a gas-insulated electrical device is disclosed in JP-A-59-189092 (1984), wherein the grounding container is constituted by a plurality of tubular barrel units each having flanges at both axial ends, and the respective tubular barrel units are connected by bolts and nuts through the corresponding flanges to complete the grounding container. Further, JP-A-59-189092 (1984) discloses to connect a tubular barrel portion and two flange portions for the tubular barrel unit by a laser welding. Tubular barrel units having a good dimensional accuracy are thereby manufactured in a short time through a single butt welding with only a small thermal deformation.

Another conventional grounding container is constituted by connecting a plurality of tubular barrel units with no flanges at the ends through arc welding.

The axial length of the respective tubular barrel units is relatively short because of a practical limitation imposed by the mode of transporting the units. Therefore, many tubular barrel units are usually needed to complete a grounding container having a required axial length.

Further, the production cost of the former grounding container is high, because the respective tubular barrel units are provided with flanges at both ends which have to be provided with a groove for receiving an O-ring for maintaining airtightness at the flange coupling.

The production cost of the latter grounding container is lower than the former one; however, when an accident such as grounding occurs in the grounding container which is operating as a part of a gas-insulated electrical device, it is necessary to cut and disassemble the grounding container at the vicinity of the accident point in order to exchange parts therearound, which takes a long time.

Further, the laser welding disclosed in JP-A-59-189092 (1984) is performed by rotating the tubular barrel portion and the flange portion with respect to a laser welding device. Therefore the laser welding device cannot be applied to a container which is fixed and cannot be rotated, such as when an additional long-sized tubular container is to be connected by laser welding to a previously installed container.

Further, JP-A-3-128183 (1991) discloses a laser working device wherein an inner cylindrical tube inserted in an outer cylindrical tube is welded to the outer cylindrical tube by a laser beam moving around the inner circumference thereof.

Still further, JP-A-59-191584 (1984) discloses a tubular body working device welded by a laser beam moving around the outer circumference of a tubular work body.

The laser working device disclosed in JP-A-3-128183 (1991) employs an optical fiber to transmit the laser beam, and is suitable for working a thin tubular body having a small diameter. Therefore, if the laser working device is applied for a long-sized tubular container having a large diameter, rigidity of a supporting member supporting a working head, including a condenser lens and a reflecting mirror, has to be redesigned, and many man-hours and a large space for setting the work head are required before and after the welding operation.

When the laser beam disclosed in JP-A-59-191584 (1984) is applied to welding in all attitudes, control of the laser beam focusing position is necessitated because the distance between the laser oscillator and a work point varies during the working operation. The control system complicates the mechanism of the device.

Still further, as disclosed, for example, in JP-A-3-9834 (1991) a laser working device which makes use of an optical fiber is known. However, such a conventional device cannot be used immediately such as for welding a container by making use of a large output laser for a long time because the device suffers from excessive energy losses in a bent optical fiber.

The laser-welded joint portions of a grounding tubular container used for a gas-insulated electrical device have to withstand a predetermined pressure. Therefore, a pressure test or an airtightness test of the welded joint portions is obligatory. However, no specific measures which facilitate the pressure test are provided for the conventional long-sized tubular container.

SUMMARY OF THE INVENTION

One object of the present invention is to provide a long-sized tubular container unit for a gas-insulated electrical device which is produced at a low production cost, constructed in a short period and is easily disassembled when an accident such as grounding has occurred in a grounding tubular container constituted by combining a plurality of the long-sized tubular container units.

Another object of the present invention is to provide a long-sized tubular container unit for a gas-insulated electrical device which facilitates an airtightness test therefor.

A further object of the present invention is to provide a laser welding device which is suitable for constructing the long-sized tubular container unit for a gas-insulated electrical device.

The long-sized tubular container unit for a gas-insulated electrical device according to the first object of the present invention comprises two first tubular barrels each having a flange portion at one end, wherein the other ends with no flange portions of the two first tubular barrels are connected through at least one laser-welded portion to complete the long-sized tubular container unit. More preferably, the long-sized tubular container unit according to the first object of the present invention comprises two first tubular barrels each having a flange portion at one end and at least one second tubular barrel with no flange portion at either end thereof, wherein the second tubular barrel is interposed between the two first tubular barrels and the respective ends of the second tubular barrel are connected to the corresponding other end portions with no flange portions of the two first tubular barrels by laser welding to complete the long-sized tubular container unit.

The long-sized tubular container unit for a gas-insulated electrical device according to the second object of the present invention comprises two first tubular barrels each having a flange portion at one end, with the respective other ends of the two first tubular barrels being connected directly by laser welding, or being connected through at least one second tubular barrel with no flange at either end thereof, by laser welding the respective corresponding ends of the first and second tubular barrels, and a local airtight chamber adjacent to the laser welding portion and provided by means of a ring and seal member disposed inside of at least one of the adjacent tubular barrels adjacent to the laser welding portion. The invention further includes a through-hole for use in an airtightness test near the laser welding portion at one of the adjacent tubular barrels, for leading the local airtight chamber to the atmosphere.

The laser welding device suitable for constructing the long-sized tubular container unit for a gas-insulated electrical device according to the third object of the present is achieved by providing a laser oscillator, a laser output optical system which is disposed at the remote end from the joint portion of one of two adjacent tubular barrels to be connected by laser welding, and which causes the laser beam from the laser oscillator in parallel with the longitudinal direction of the tubular barrels to be welded and to circulate the laser beam along the circumference of the tubular barrels to be welded, and a welding head which is disposed around the connecting portion of the adjacent tubular barrels. The welding head includes a working head which condenses the laser beam to carry out laser welding, and rotates along the circumference of the adjacent tubular barrels to be welded so that the laser beam outputted from the laser output optical system properly enters into the working head. Preferably these three components are constituted separately.

Further, in the laser welding device according to the present invention, tracing control with regard to relative position between the working head and the joint portion is preferably performed to thereby stabilize the laser welding quality.

Still further, the working head is preferably provided with a detecting element for detecting such flaws as gaps and dislocations at the joint portion, and for feeding back an output signal from the detecting element for controlling welding speed and laser output to obtain a uniform welding bead at the joint portion.

In the laser welding device according to the present invention, when a laser beam receiving center of the welding head coincides with the center of the output laser beam axis from the laser output optical system, the laser beam welding is optimized. Accordingly, when mirrors both in the welding head and the laser output optical system are driven in synchronism and in real time so as to coincide both centers at a vertical cross section with regard to the longitudinal direction of the tubular barrels during the laser beam welding, the laser welding device according to the present invention is also applicable to tubular barrels having rectangular cross-sections by properly selecting the laser beam propagation path in the radial direction.

Moreover, when a tracing range with respect to a welding line is determined to be broad, it is possible to weld the joint portion even if the joint portion is displaced from the longitudinal direction of the adjacent tubular barrels.

Still further, the laser welding device suitable for constructing the long-sized tubular container unit according to the third object of the present invention is achieved by providing a laser oscillator, a work head, one or more flexible optical waveguides disposed between the laser oscillator and the work head for supplying a laser beam of a large output power to the work head, means for circulating the work head around a circumference of the joint portion of adjacent tubular barrels to be welded, means for tracing the joint portion for shifting the work head to an optimum position and means for correcting a gap and dislocation at the joint portion of the adjacent tubular barrels to be welded and for fixing the position thereof.

The laser welding device further comprises a spiral track having a comparatively large diameter through which a flexible optical fiber waveguide extends to move over the tubular barrels to be welded, thereby achieving welding in all attitudes and continuous laser welding with large output power due to reduction of energy losses in the flexible optical fiber waveguide.

Since the long-sized tubular container unit according to the present invention is constructed by connecting a plurality of tubular container subunits, that is, tubular barrels, by laser welding and by eliminating the conventional flanges for connecting the same, the construction cost is reduced. Further, since the long-sized tubular grounding container unit is provided with a pair of flanges at both ends for connecting with other long-sized tubular grounding container units for completing a tubular grounding container for a gas-insulated electrical device, when an accident such as grounding occurs in the tubular grounding container during operation as a part of a gas-insulated electrical device, the tubular grounding container can be disassembled at a proper connecting portion through flanges, and parts at the accident point can be exchanged within a short time after the accident.

Further, since the long-sized tubular container unit according to the present invention is provided with a local airtight chamber adjacent to the respective laser-welded joint portions of adjacent tubular barrels, an airtightness test for the long-sized tubular container unit can be performed easily, and the safety of the test is improved because the test is performed in a limited space.

Still further, since the laser output optical system which directs the laser beam in parallel with the longitudinal direction of the tubular barrels to be welded and which circulates around the circumference of the tubular barrels to be welded, the welding head including the work head which condenses the laser beam onto the joint portion and welds the same, and the means for rotating the work head around the circumference of the tubular barrels to be welded and for controlling incidence of the laser beam outputted from the laser output optical system into the work head in the laser welding device according to the present invention work respectively as a laser beam output unit and a laser beam receiving unit and are mechanically separated from each other, both units can be controlled without regard to the length of the tubular barrels to be welded nor the inertia and rigidity of an optical system forming the laser beam transmission passage, because the laser beam is transmitted from the laser output optical system to the welding head through open air.

Still further, since a signal representing the center of the laser beam output is outputted from the laser output optical system and, based upon the signal received at the welding head side, the mirrors in the laser output optical system and the welding head are controlled in synchronism and in real time so as to coincide the center of laser beam output from the laser output optical system with the laser beam receiving center of the welding head with respect to the longitudinal direction of the tubular barrels to be welded, the centering operation of the laser beam at the start of the laser welding device is simplified.

In another embodiment of the laser welding device according to the present invention, one or more flexible optical fiber waveguides are provided for transmitting the laser beam emitted from the laser oscillator into the work head, wherein the optical fiber winds one or more times around the tubular barrels to be welded in association with the rotation of the work head over the entire circumference of the tubular barrels. In such instance, the optical fiber can be constituted as a continuous one or one having an optical coupling means such as a lens at the intermediate thereof.

With the laser welding device according to the present invention, continuous welding in all attitudes is enabled for the joint portions of tubular barrels. Further, with the means for correcting gap and dislocation flaws at the joint portion of the adjacent tubular barrels to be welded, gaps at the butt joint of the tubular barrels and dislocations in the thickness direction of the tubular barrels are set in an allowable range of the laser welding and, in addition, the tracing means provided at the work head controls the relationships between the welding line and the laser beam focusing point and between the laser beam focusing point and the thickness of the tubular barrels in accordance with predetermined levels to thereby stabilize the quality of the laser welding.

Since the flexible optical fiber waveguide, which connects the laser oscillator to the work head to be rotatable around the circumference of the tubular barrels to be welded, winds over the tubular barrels in accordance with the progress of the welding along a spiral track having a predetermined diameter during the welding operation in all attitudes, energy losses of the laser beam in the optical fiber are reduced, and continuous laser welding is enabled.

DETAILED DESCRIPTION OF THE PREFERRED EMBODIMENTS

Hereinbelow, the present invention is explained in detail with reference to particular embodiments.

Figure 1:
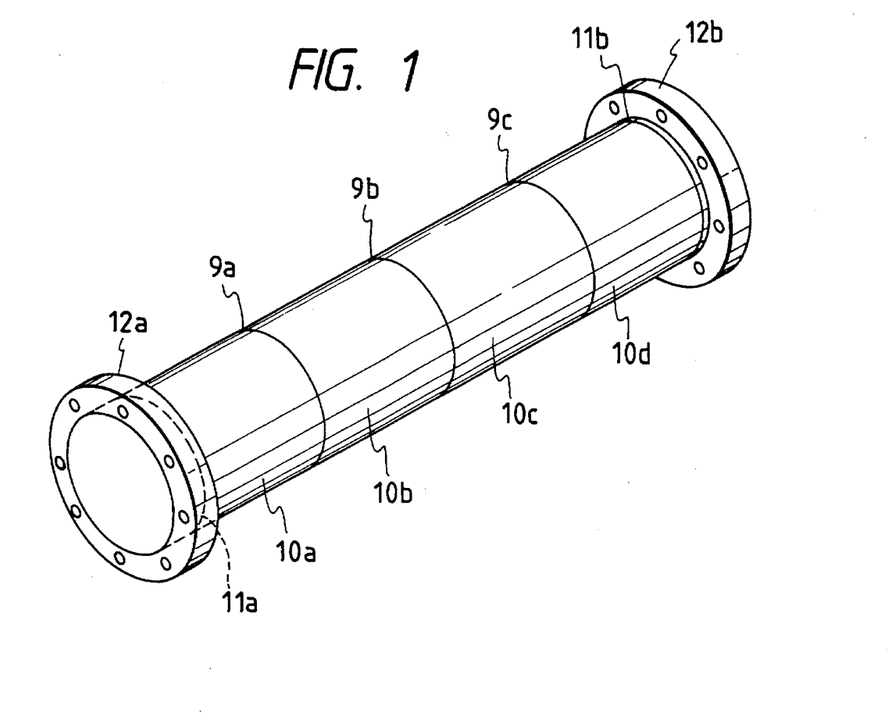
FIG. 1 is a perspective view of one embodiment of a long-sized tubular container unit according to the present invention.

FIG. 1 shows one embodiment of a long-sized tubular grounding container unit for a gas-insulated electrical device. A plurality of tubular barrels are shown connected together to form a grounding container filled with an insulation gas such as $SF_6$. A conductor supplied with a predetermined electrical potential is accommodated therein while being electrically insulated from the container wall through insulating supporting members.

In the present embodiment, a tubular barrel 10a, to the left end of which a flange 12a with a neck portion is connected at a butt joint portion 11a by laser welding, two tubular barrels 10b and 10c having no flanges, and a tubular barrel 10d, to the right end of which a flange 12b with a neck portion is connected at a butt joint portion 11b (also by laser welding), are aligned along their common longitudinal axis so as to face each other. The barrels are connected at butt joint portions 9a, 9b and 9c by laser welding to complete a long-sized tubular grounding container unit.

Figure 2:
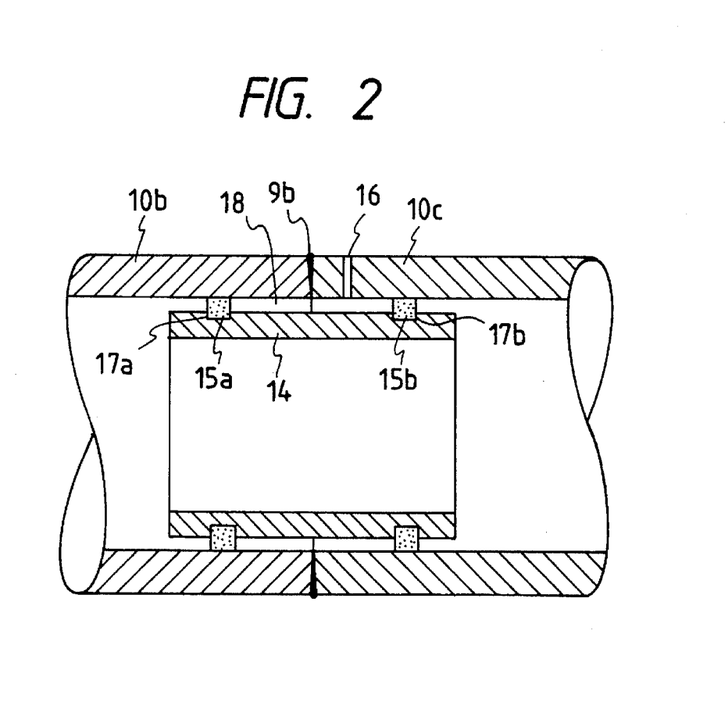
FIG. 2 is a cross-sectional view of one embodiment of a local airtight chamber applicable at a joint portion of the tubular container unit shown in FIG. 1.
Figure 3:
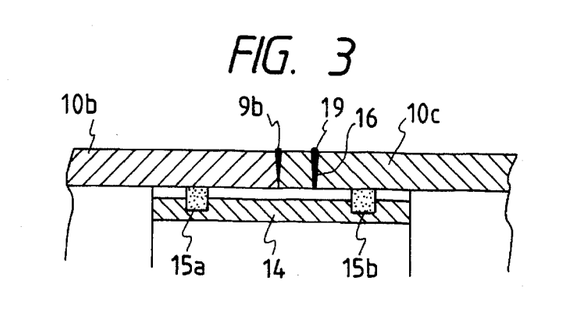
FIG. 3 is a cross-sectional view of an embodiment of the local airtight chamber shown in FIG. 2 after an airtightness test is completed.

FIG. 2 is a cross-sectional view illustrating a local airtight structure at a joint portion between adjacent tubular barrels. Namely, a local airtight chamber 18 is formed inside the joint 9b between the tubular barrels 10b and 10c by disposing in advance a ring 14 having seal members 15a and 15b mounted in grooves formed around the outer circumference of the ring 14. Further, a hole 16 is formed in the wall of the tubular barrel 10c at the vicinity of the joint portion 9b for airtightness testing. The hole 16 is sealed by a weld 19, as shown in FIG. 3, after completing the airtightness test to close the local airtight chamber 18.

Figure 4:
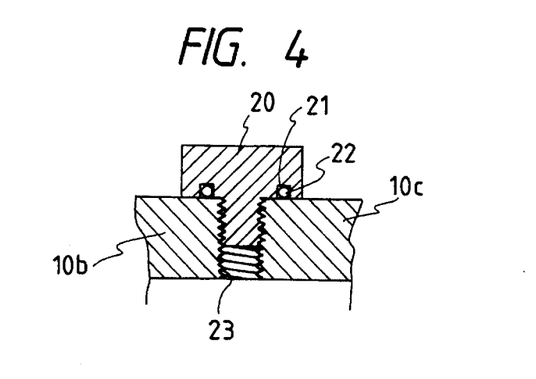
FIG. 4 is a cross-sectional view showing a modified airtight structure of FIG. 3.

Instead of sealing the hole 16 by welding, the hole 16 can be threaded as designated by reference numeral 23 in FIG. 4, and the hole 16 can be sealed by a bolt 20 after the airtightness test. The bolt 20 can be provided with a groove 21 into which a seal member 22 is mounted, and with which airtightness of the local airtight chamber 18 is maintained.

Figure 5:
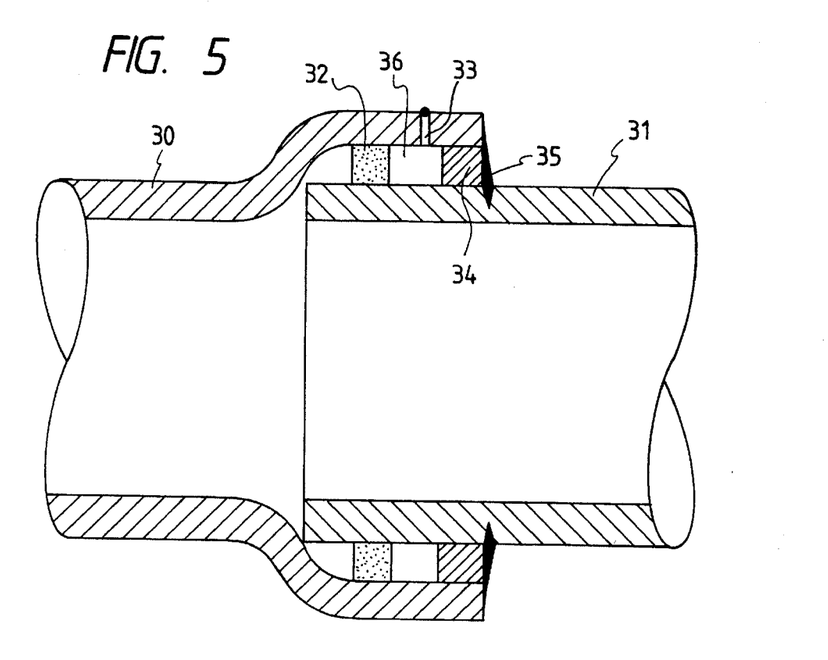
FIG. 5 is a cross-sectional view of another embodiment of a local airtight chamber applicable at a joint portion of the tubular container unit shown in FIG. 1.
Figure 6A:
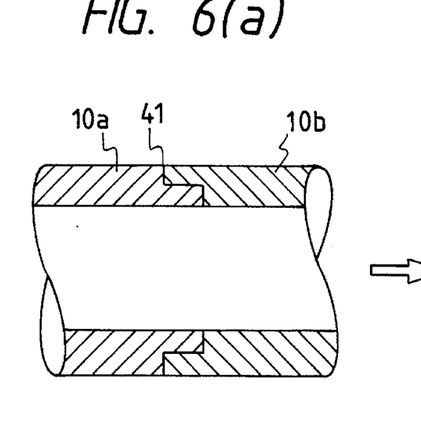
FIG. 6(a) is a cross-sectional view of one embodiment of a butt joint geometry applicable at a joint portion of the tubular container unit shown in FIG. 1.
Figure 6B:
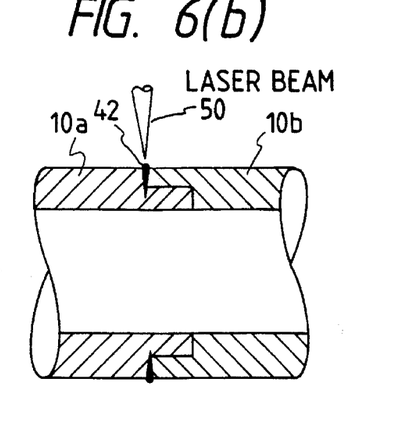
FIG. 6(b) is a cross-sectional view of the butt joint shown in FIG. 6(a) after laser beam welding is completed.

FIG. 5 shows another local airtight structure at a joint portion between adjacent tubular barrels of a long-sized tubular grounding container unit.

In FIG. 5, an end diameter of a tubular barrel 30 is in advance enlarged by a forming device such as a press machine, and a tubular barrel having a smaller diameter is inserted inside the tubular barrel 30. A ring-shaped seal member 32 is disposed in an inner part of an annular space formed between the inner wall of the tubular barrel 31, and a ring 34 is also disposed in the annular space near the end of the tubular barrel 30. Thus, a local airtight chamber 36 is formed by connecting the ring 34 and the tubular barrels 30 and 31 through laser welding. A hole 33 for use in airtightness testing and leading to the local airtight chamber 36 is formed in the wall of the tubular barrel 30. After the airtightness test, the hole 33 is sealed by welding. However, the hole 33 can also be sealed in the same manner as explained in connection with FIG. 4.

Figure 7A:
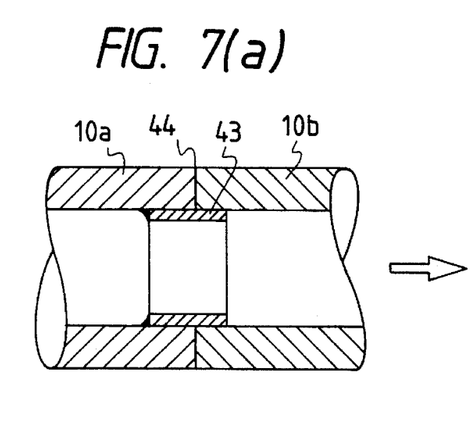
FIG. 7(a) is a cross-sectional view of another embodiment of a butt joint geometry applicable at a joint portion of the tubular container unit shown in FIG. 1.
Figure 7B:
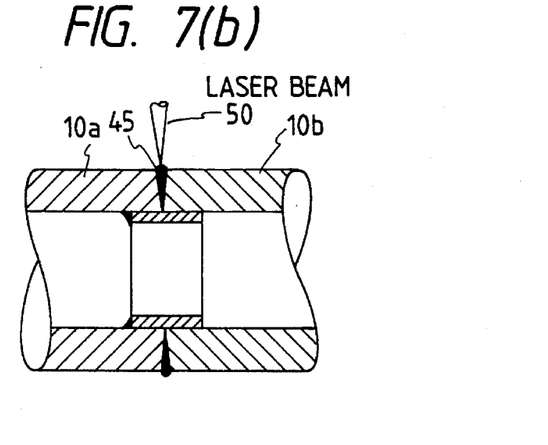
FIG. 7(b) is a cross-sectional view of the butt joint shown in FIG. 7(a) after laser beam welding is completed.
Figure 8A:
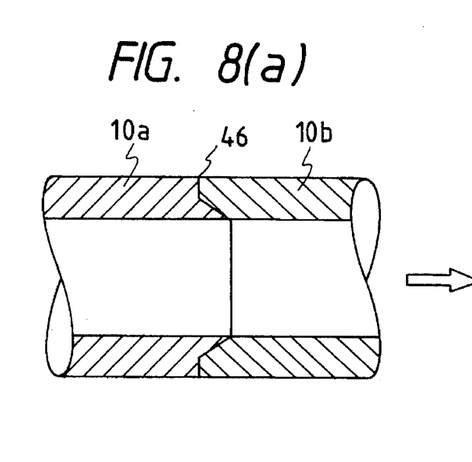
FIG. 8(a) is a cross-sectional view of a further embodiment of a butt joint geometry applicable at a joint portion of the tubular container unit shown in FIG. 1.
Figure 8B:
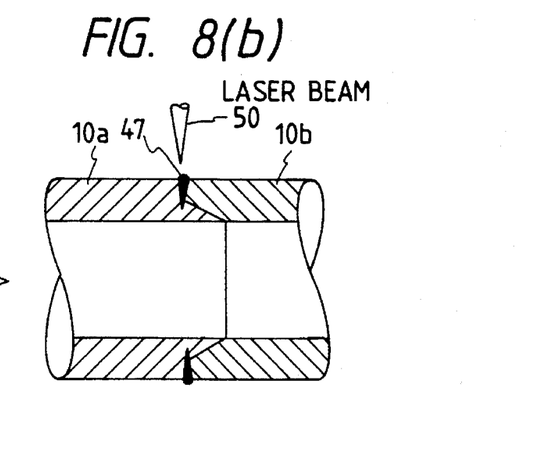
FIG. 8(b) is a cross-sectional view of the butt joint shown in FIG. 8(a) after laser beam welding is completed.
Figure 9A:
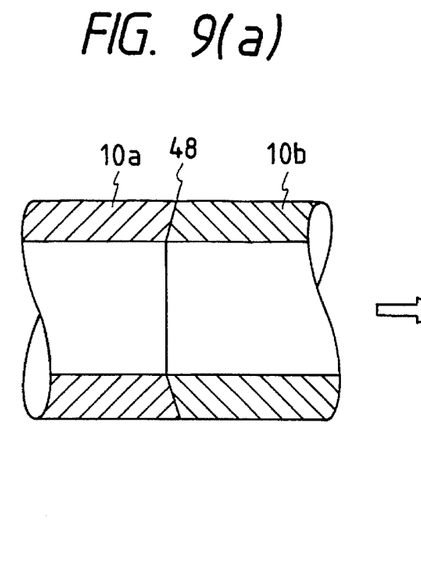
FIG. 9(a) is a cross-sectional view of a still further embodiment of a butt joint geometry applicable at a joint portion of the tubular container unit shown in FIG. 1.
Figure 9B:
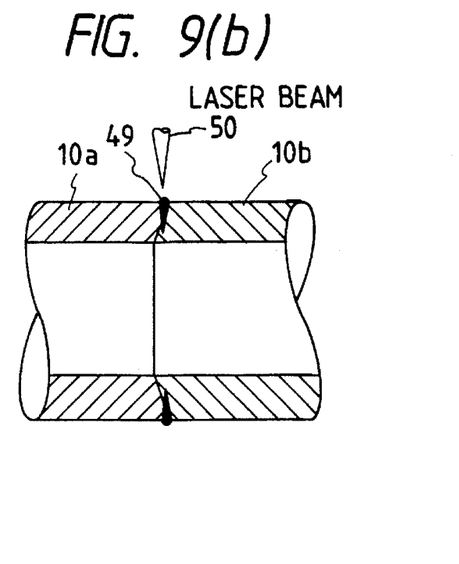
FIG. 9(b) is a cross-sectional view of the butt joint shown in FIG. 9(a) after laser beam welding is completed.

FIG. 6(a), FIG. 7(a), FIG. 8(a) and FIG. 9(a) respectively show states of the butt joint geometries before laser welding is performed, wherein the adjacent tubular barrels are moved to face each other so that the gap at each of joints 41, 44, 46 and 48 is reduced to smaller than the diameter of the condensed laser beam used for welding. For the joint geometry as shown in FIG. 7(a), a ring 43 is connected to the inner wall of the tubular barrel 10a.

FIG. 6(b), FIG. 7(b), FIG. 8(b) and FIG. 9(b) respectively show states of the corresponding joint portions after laser welding has been performed. A condensed laser beam 50 is controlled to focus at the butt joint portions between the adjacent tubular barrels 10a and 10b, and the laser beam welding continues until immediately before the inner wall surface of the tubular barrel 10a or 10b to complete connection of the tubular barrels 10a and 10b.

In the above embodiments, since a long-sized tubular grounding container unit is constructed by connecting the tubular barrels through laser welding which causes low distortion, the conventional requirement for post-arc welding foundation and large-scale machinery are eliminated. Further, the laser welding is performed at a high speed; therefore, the construction period of a grounding container for a gas-insulated electrical device is greatly reduced, and with the provision of the local airtight chamber adjacent the welded joint portion of the tubular barrels, an airtightness test of the long-sized tubular container unit is performed easily and safely. Still further, with the joint geometries of the tubular barrels to be welded, no molten metals created during welding drop inside the tubular barrels; thus the conventional finishing work after welding is also eliminated. Moreover, with the laser welding, a high-quality joint portion having extremely limited internal defects such as blow holes and pin holes is obtained.

Now, embodiments of laser welding devices according to the present invention that are suitable for constructing the long-sized tubular grounding container units are explained hereinbelow.

Figure 10:
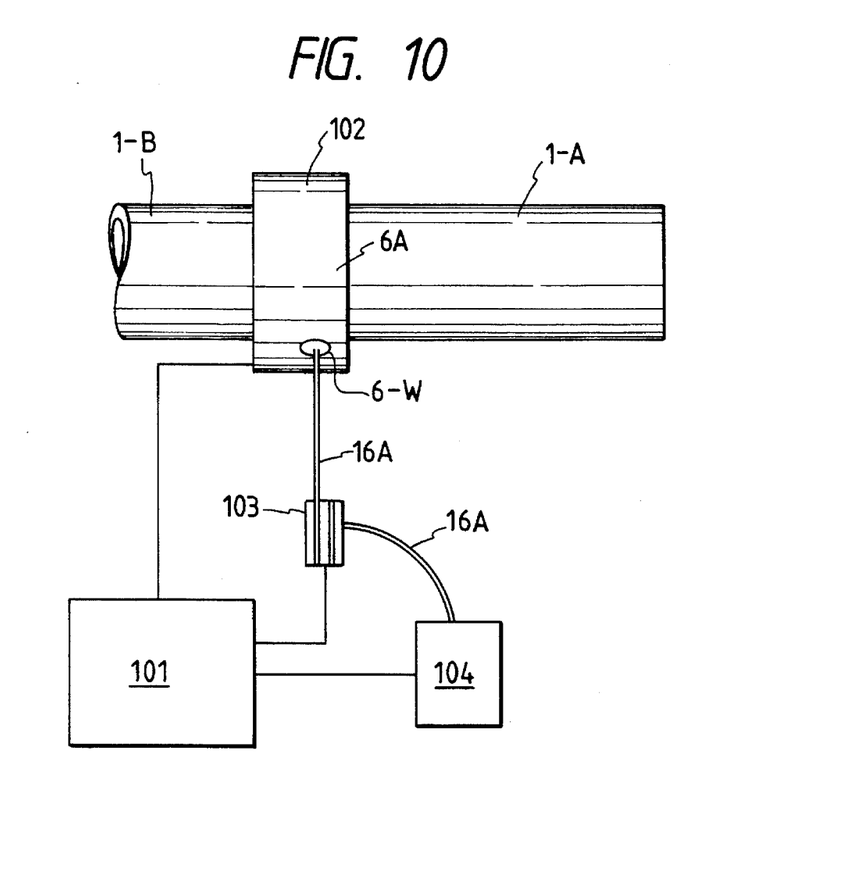
FIG. 10 is a fundamental constitutional diagram of one embodiment of a laser welding device according to the present invention suitable for connecting tubular barrels.

FIG. 10 is a diagram showing a fundamental constitution of a laser welding device according to one embodiment of the present invention, wherein a welding head 102 is fixedly attached around a joint portion A of tubular barrels 1-A and 1-B, an optical fiber 16A is drawn out from a hole 6-W formed on an outer circumferential frame 6A of the welding head 102, a laser beam passage between a laser oscillator 104 and an optical fiber feeding reel 103 is also coupled by an optical fiber 16A, and a control unit 101 for controlling the above respective components are also provided.

Figure 11:
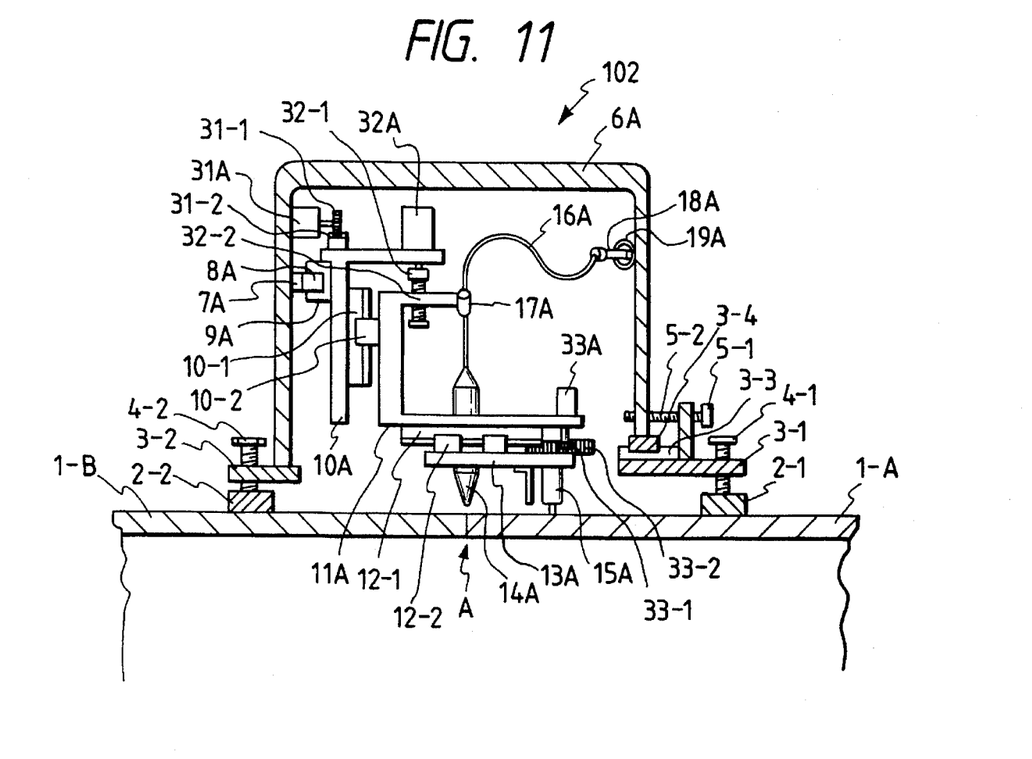
FIG. 11 is a cross-sectional view of one embodiment of a welding head applicable to the laser welding device shown in FIG. 10.

As illustrated in FIG. 11, around the circumferences of the tubular barrels 1-A and 1-B, metal fixtures 2-1 and 2-2 are uniformly arranged. On the metal fixtures 2-1 and 2-2, ring-shaped bases 3-1 and 3-2 are disposed, and the metal fixtures 2-1 and 2-2 are respectively fastened to the tubular barrels 1-A and 1-B by fixing screws 4-1 and 4-2 which are driven into screw holes bored at the ring-shaped bases 3-1 and 3-2. The ring-shaped base 3-1 is provided with a rail 3-3 extending in the longitudinal direction of the tubular barrel 1-A, and the outer circumferential frame 6A is coupled to the rail 3-3 through a slidable member 3-4. The positions of the outer circumferential frame 6A and the ring-shaped base 3-1 can be adjusted in the longitudinal direction of the tubular barrel 1-A by a movable screw head 5-1 and screw shaft 5-2.

On the other hand, a ring-shaped base 3-2 is fixed to the outer circumferential frame 6A at the side of the tubular barrel 1-B so that the distance of a gap at the joint portion A of the tubular barrels 1-A and 1-B can be adjusted by rotating the movable screw head 5-1 and screw shaft 5-2. Further, on the inner face of the outer circumferential frame 6A, a rail base 7A is secured and a slidable member 9A is movably mounted on a ring-shaped rail 8A secured on the rail base 7A. A work head base 10A is secured on the slidable member 9A and a vertical rail 10-1 is attached on the work head base 10A, and further a slidable member 10-2 which moves along the vertical rail 10-1 is assembled therewith. A metal table piece 11A is secured to the slidable member 10-2, and on the metal table piece 11A a longitudinal rail 12-1 and a slidable member 12-2 assembled therewith are attached. Still further, a stage 13A is attached to the slidable member 12-2, and on the stage 13A, a condensing optical system 14A for laser working use is attached. A flexible optical waveguide (herein after called an optical fiber) 16A which transmits a laser beam to the condensing optical system 14A is fixed by a metal fixture 17A secured at the stage 11A. Still further, the optical fiber 16A is held by a metal piece set 18A which is slidable along a spiral rail 19A in a circumferential direction secured to the outer circumferential frame 6A.

Figure 12:
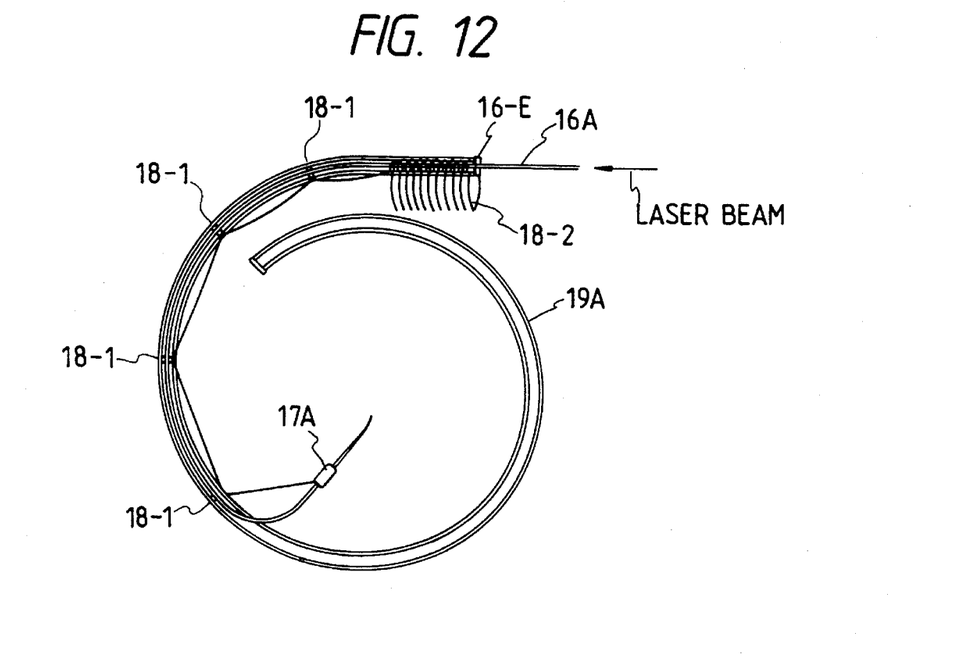
FIG. 12 is a side view of a spiral optical fiber guide track which is incorporated in the welding head shown in FIG. 11.

As illustrated in FIG. 12, the optical fiber 16A is designed to extend outwardly from an outer circumferential end 16-E of the circumferential spiral rail 19A away from the metal piece set 18A through the bore 6-W formed at the outer circumferential frame 6A. The metal piece set 18A comprises a plurality of metal pieces 18-1 including a slidable member which slides along the circumferential spiral rail 19A, and a holding member which loosely holds the optical fiber 16A and permits sliding thereof in its sliding direction. Further, the plurality of metal pieces starting from the outer circumferential end 16-E of the circumferential spiral rail 19A to the metal fixture 17A on the stage 11A are connected by a fishing gut 18-2.

With the above structure, the optical fiber 16A is wound within the outer circumferential frame 6A along the circumferential spiral rail 19A through the metal piece set 18A in response to the rotation of the metal fixture 17A according to the progress of the laser welding. An extreme bending of the optical fiber is thereby eliminated, and since the forces caused by the rotation and acting on the metal piece set 18A are transmitted to the fishing gut 18-2, an external force on the optical fiber 16A is prevented.

Further, as illustrated in FIG. 11, a motor 31A and a pinion 31-1 for driving the work head base 10A are mounted on the outer circumferential frame 6A, and the pinion 31-1 engages with a rack 31-2 secured to the work head base 10A to control the rotating drive therefor. With a motor 32A and a power screw 32-1 on the work head base 10A, and a threaded hole 32-2 on the metal table piece 11A, the metal table piece 11A is driven in the vertical direction as well. A motor 33A and a pinion 33-1 on the metal table piece 11A and a rack 33-2 on the stage 13A enable the stage 13A to be driven in the longitudinal direction of the tubular barrels 1-A and 1-B. Thus, the condensing optical system 14A for laser working use is driven so as to trace the joint portion A.

The respective motors 31A, 32A and 33A are controlled by the control unit 101, and on the stage 13A a detector 15A for detecting a deviation in thickness of the tubular barrel 1-A and an industrial use TV 20A (see FIG. 13) for monitoring the joint A are mounted. Signals from the detector 15A and the TV 20A are transmitted to the control unit 101 for controlling the motors 31A, 32A and 33A.

According to the present embodiment, the condensing optical system 14A for the laser can trace along the joint portion of the tubular barrels 1-A and 1-B so as to enable accurate laser welding.

Figure 13:
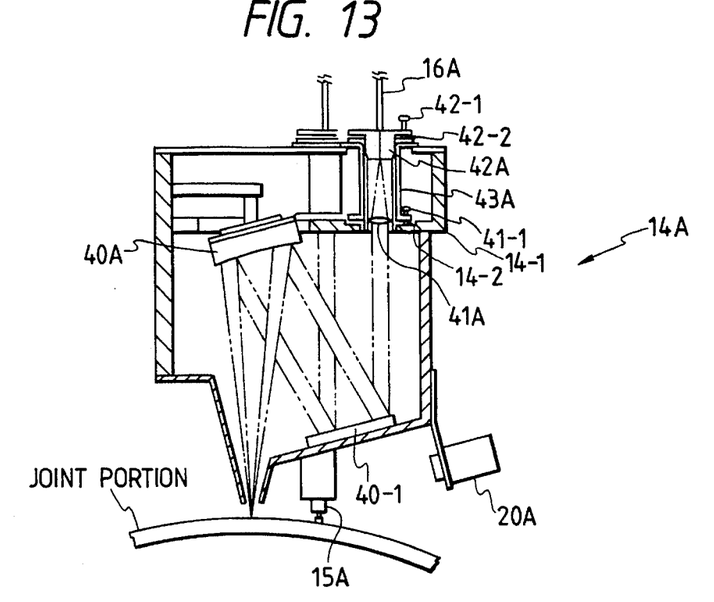
FIG. 13 is a cross-sectional view of a work head, including an optical system for condensing a laser beam for material processing, which is incorporated in the welding head shown in FIG. 11.

FIG. 13 shows an example of the condensing optical system 14A using a $CO_2$ laser, which uses a plurality of optical fibers 16A for obtaining the necessary laser beam power transmitting capacity, and a parabolic mirror 40A.

The laser beam emitted from the optical fibers 16A is shaped into a parallel laser beam through a lens 41A and enters into the parabolic mirror 40A after being reflected by a mirror 40-1. By means of a screw 42-1 and a spring 42-2 through which an optical fiber fitting member 42A securing the optical fiber therein is held inside a lens holding cylinder 43A, the inclination of optical axes of the optical fiber 16A and a lens 41A attached at the top end of the lens holding cylinder 43A can be adjusted respectively, and by means of a screw 41-1 and a spring 41-2 which couples the lens holding cylinder 43A with a base 14-1 of the condensing optical system 14A, the optical axis of the parallel laser beam is finely adjusted to the optical axis of the parabolic mirror 40A. Thereby a plurality of laser beams are condensed at a focus via the parabolic mirror 40A.

Figure 14A:
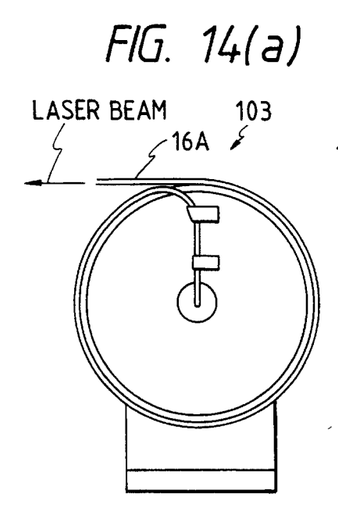
FIG. 14(a) is a side view of an optical fiber feeding reel which is applicable to the laser welding device shown in FIG. 10.
Figure 14B:
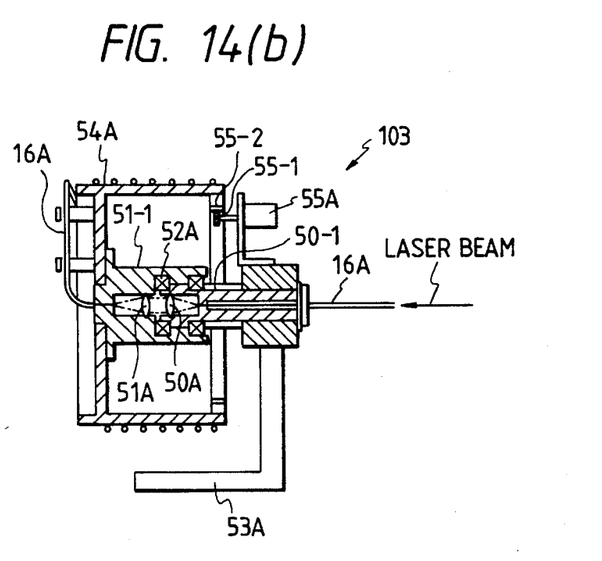
FIG. 14(b) is a cross-sectional view of the optical fiber feeding reel shown in FIG. 14(a)

FIG. 14(a) and FIG. 14(b) show one embodiment of the optical fiber feeding reel 103 for the optical fiber 16A, wherein the laser beam emitted from the laser oscillator 104 is formed into a parallel laser beam via a lens 50A and inputted into the optical fiber 16A via a light receiving lens 41A. In order to hold the lens 50A and the light receiving lens 51A rotatably in the optical system of the optical fiber feeding reel 103, a holding member 50-1 for the lens 50A and a holding member 51-1 for the light receiving lens 51A are coupled via a bearing 52A. The holding member 50-1 is fixed to a stationary frame 53A, and the holding member 51-1 is secured to a rotatable drum 54A and rotates therewith. The optical fiber 16A is wound around the circumference of the rotatable drum 54A and one end of the optical fiber 16A is drawn out toward the welding head 102.

Further, by means of a motor 55A and a pinion 55-1 on the stationary frame 53A and a rack secured to the rotatable drum 54A, the rotatable drum 54A is rotatably driven. Herein, since the motor 55A and the motor 31A in the welding head 102 are driven in synchronism, no external force is applied to the optical fiber 16A.

Figure 15:
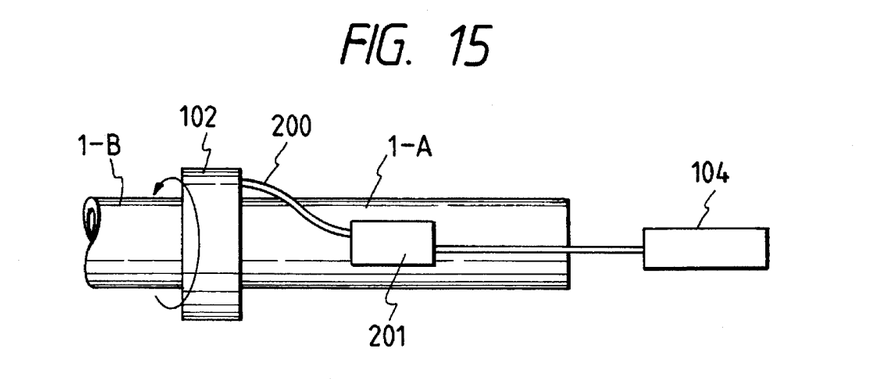
FIG. 15 is a fundamental constitutional diagram of another embodiment of a laser welding device according to the present invention suitable for connecting tubular barrels.

FIG. 15 is a fundamental constitutional diagram of another embodiment of a laser welding device according to the present invention.

In FIG. 15, the optical fiber 16A is fed out from an arm 200 via an arm feeding device 201 to the welding head 102 secured around the joint portion A of the tubular barrels 1-A and 1-B. A radius of curvature of the optical fiber which circulates around the joint portion A of the tubular barrels 1-A and 1-B along with the rotation of the condensing optical system 14A for laser working use in the welding head 102 can be roughly expressed by:

$$\sqrt{(LL)^2 + (\pi D)^2/2\pi} \quad ,$$

where LL is the maximum longitudinal distance between the welding head 102 and the arm feeding device 201, and D is a projection diameter of the spiral arm 200 in a vertical plane with respect to the longitudinal direction of the tubular barrels. The laser oscillator 104 is coupled to one end of the arm 200 and is designed to be movable in accordance with feeding of the arm 200 via the arm feeding device 201.

Further, according to the present embodiment the arm feeding device 201 moves on the tubular barrel 1-A while feeding out the arm 200; thus, no external forces are applied on the optical fiber 16A held in the arm 200.

Figure 16:
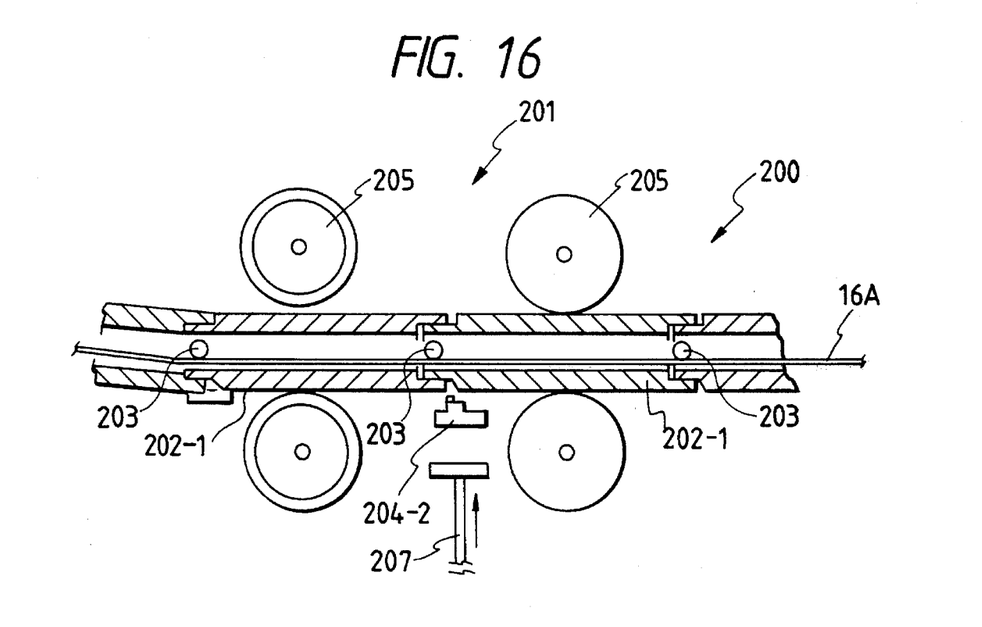
FIG. 16 is a cross-sectional view of an arm feeding device applied to the laser welding device shown in FIG. 15.

FIG. 16 shows a cross sectional view of one embodiment of the arm 200 and the arm feeding device 201.

Figure 17:
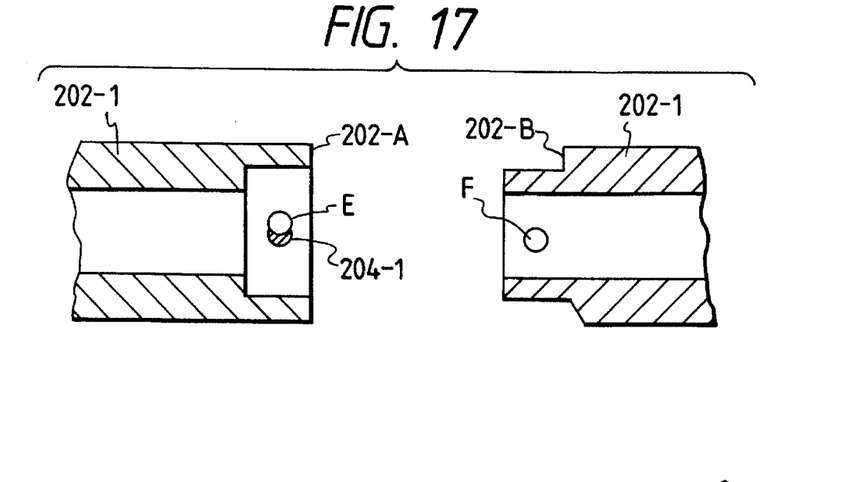
FIG. 17 is a cross-sectional view of arm members applied to the arm feeding device as shown in FIG. 16.

The arm 200 which supports the optical fiber 16A is constituted by a plurality of arm members 202-1, which are connected by pins 203 in order to permit an inclination of a small angle $\theta_1$ with respect to vertical cross section in the longitudinal direction of the optical fiber 16A. The respective ends 202-A and 202-B of the arm member 202-1 are configured as illustrated in FIG. 17, in that the end 202-B can be inserted into the end 202-A and holes E and F are formed at the respective ends of the adjacent two arm members 202-1 to receive a pin 203. The hole E formed at the end 202-A is configured in an ellipse; therefore, by inserting a metal piece 204-1 into a clearance in hole E left after insertion of the pin 203, one arm member 202-1 can be twisted by a small angle $\theta_2$ to another arm member with respect to their longitudinal axes.

The arm 200 constituted by the arm members 202-1 is fed out by a plurality of rotating rollers 205 in the arm feeding device. Near the rotating rollers 205 there are provided an insertion mechanism (not shown) for the metal piece 204-1 and another insertion mechanism 207 for metal pieces 204-2, which are to be inserted into the gap formed between the end faces 202-A and 202-B. One arm member 202-1 can thereby be inclined by a small angle $\theta_1$ and can be twisted by a small angle $\theta_2$ with respect to an adjacent arm member 202-1. As a result, via a continuous inner passage thus formed in the arm, the optical fiber 16A is connected to the condensing optical system 14A.

Now, other embodiments of laser welding devices according to the present invention are explained with reference to FIG. 18 through FIG. 23.

Figure 18:
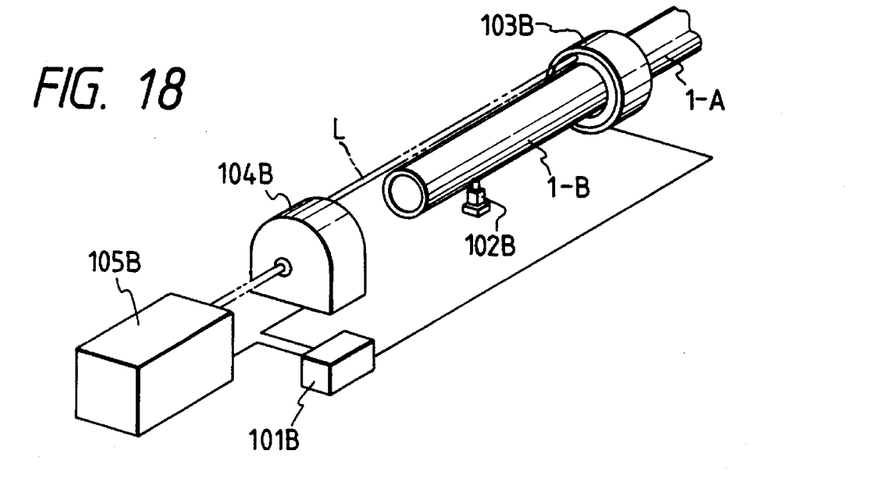
FIG. 18 is a fundamental constitutional diagram of a further embodiment of a laser welding device according to the present invention suitable for connecting tubular barrels.

In FIG. 18, the tubular barrel 1-A and the tubular barrel 1-B facing the tubular barrel 1-A and connected at the joint portion A are supported by a supporting device 102B. A welding head 103B is set around the joint portion A of the tubular barrels 1-A and 1-B, and is fed with a laser beam from a laser beam circulating optical system through which the laser beam from a laser oscillator 105B is refracted and/or reflected. A control unit 101B controls these components in real time, and in particular, calculates any deviation of a received optical signal from a reference signal representing a desired center position of the laser beam, and sends out a control signal based upon the deviation to a motor which drives a condensing optical system in the welding head 103B.

Figure 19:
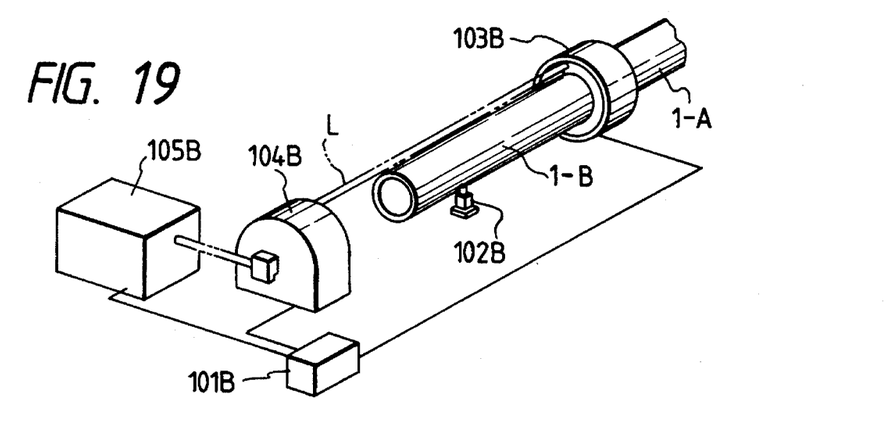
FIG. 19 is a fundamental constitutional diagram of a still further embodiment of a laser welding device according to the present invention suitable for connecting tubular barrels.

FIG. 19 is a modification of the embodiment shown in FIG. 18, wherein the welding head 103b and the laser beam circulating optical system 104B are placed in parallel with the tubular barrel 1-A. However, the laser oscillator 105B is located in such a manner that the angle of the optical axis of the laser beam outputted therefrom into the laser beam circulating optical system 104B can be set at any angle. A space for a construction of the long-sized tubular grounding container unit can thereby be reduced.

Figure 20:
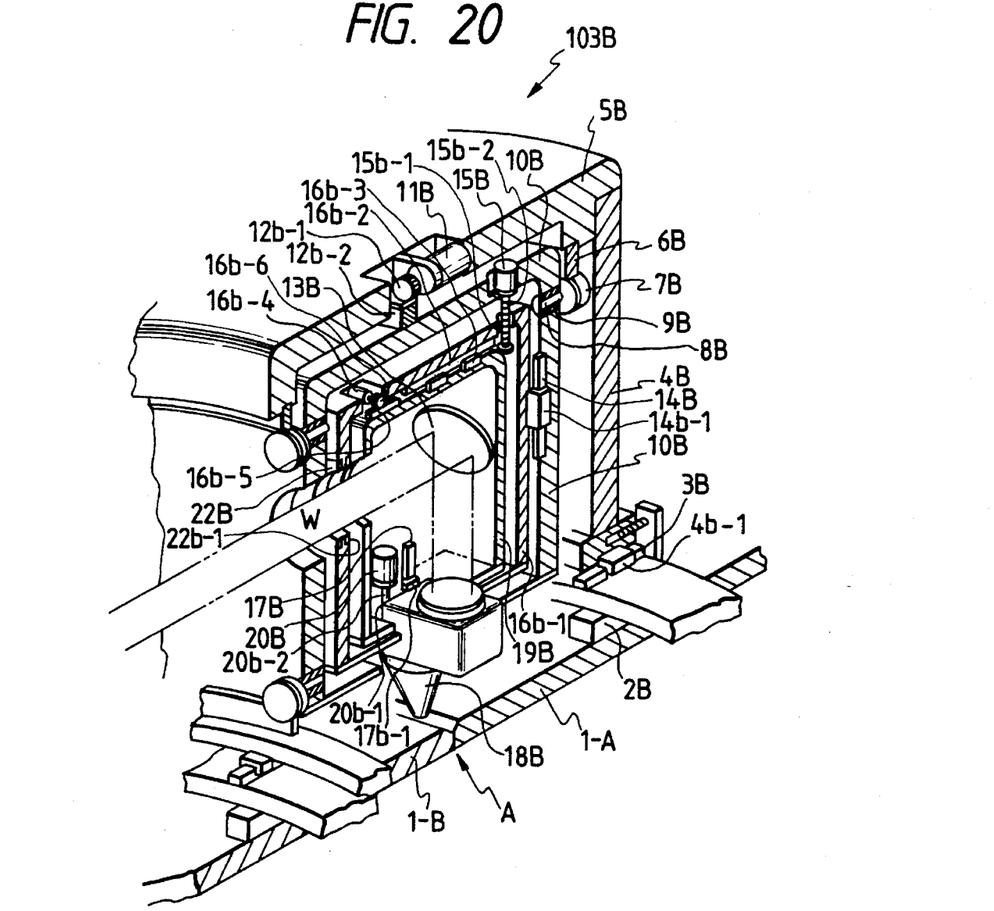
FIG. 20 is a cross-sectional perspective view of a welding head applicable to both laser welding devices shown in FIG. 18 and FIG. 19.

FIG. 20 shows a detail of the welding head 103B shown in FIG. 18 and FIG. 19.

Around the joint portion A of the facing tubular barrels 1-A and 1-B, metal fittings 2B are uniformly disposed. On a ring member arranged on the metal fittings 2B, a rail 3B extending in the longitudinal direction parallel to the longitudinal direction of the tubular barrel 1-A is attached, and a slidable member 4b-1 is slidably coupled to the rail 3B extending in the longitudinal direction. A stay 4B is attached to the slidable member 4b-1 and an outer circumferential guide 5B is supported by the stay 4B so as to surround the joint portion A of the tubular barrels 1-A and 1-B.

Further, a rail 6B extending in the circumferential direction is attached to the inner wall of the outer circumferential guide 5B, and a slidable member 7B moves along the circumferential rail 6B. The slidable member 7B is provided with an axle shaft 8B and is coupled with a rotatable frame 10B through a bearing 9B. Thereby, the rotatable frame 10B can rotate on the circumferential rail 6B along the outer circumferential guide 5B in accordance with the rolling movement of the slidable member 7B in such a manner to describe a correct circle.

Still further, through a pinion 12b-1 for a rotatable frame driving motor 11B which is attached to the outer circumferential guide 5B, a rotating movement is transferred to a rack 12b-2 and the rotatable frame 10B is driven in the circumferential direction. A guide rail 14B disposed in the thickness direction of the tubular barrels is attached on the inner wall of the rotatable frame 10B, and a slidable member 14b-1 slides on the guide rail 14B. A frame 16b-1 of the optical condensing system is secured to the slidable member 14b-1. A threaded hole 15b-1 is formed at the frame 16b-1 for the optical condensing system. Through rotation of a drive motor 15B for the optical condensing system which is attached on the rotatable frame 10B, a power screw 15b-2 is driven into the threaded hole 15b-1 to set the distance between the joint portion A of the tubular barrels 1-A and 1-B and the frame 16b-1 for the optical condensing system at any value.

Still further, an optical condensing stage 19B is provided on the frame 16b-1 for the optical condensing system and is movably supported in the longitudinal direction of the tubular barrel 1-A by a rail 16b-2 and a rack 16b-3, and further, fine movement of the optical condensing stage 19B is performed by a drive motor 16b-4, a rack 16b-5 and a pinion 16b-6.

A vertical guide rail 17B for a work head 18B is fixed on the optical condensing stage 19B and a slidable member 17b-1 is slidably mounted on the guide rail 17B. The work head 18B secured to the slidable member 17b-1 is supported so as to permit fine adjustment in the thickness direction of the tubular barrel 1-A by means of a drive motor 20B for the work head 18B, a threaded hole 20b-1 and a power screw 20b-2.

In the present embodiment, the laser beam enters into a reflection mirror 13B secured on the optical condensing stage 19B through an incidence window W formed at the rotating frame 10B. At the reflection mirror 13B, the laser beam is reflected to a direction perpendicular to the longitudinal center axis of the tubular barrels 1-A and 1-B and enters into the work head 18B, and further the reflected laser beam is condensed to the joint portion A by a parabolic mirror 21B (see FIG. 23). A light receiving element 22B arranged around the circumference of the incidence window W receives a signal representing the center position of the laser beam outputted from the laser beam circulating optical system 104B, and the received signals are successively transmitted to the control unit 101B. Then the control unit 101B sends out a control signal to the drive motor 15B for the optical condensing system to correct the deviation based on the received optical signal and a reference signal so as to coincide the center axis the laser beam with the center of the incidence window W.

Further, a tracing sensor 23B is installed on the work head 18B and the distance between the joint portion A and the work head 18B in the wall thickness direction of the tubular barrels is detected, and then the detected signal is successively transmitted to the control unit 101B. The control unit 101B sends out a control signal based on the detected signal to the drive motor 20B for the work head 18B to correct the distance.

Further, a light receiving element 22b-1 is provided around the circumference of the incidence window W at the side of the reflection mirror 13B, and the reflected laser beam is monitored thereby during laser welding. Further, a signal representing the laser welding condition is successively transmitted to the control unit 101B. Through processing of the signal representing the laser welding condition, variations of such as the laser power and the laser welding speed are determined to thereby control the laser oscillator 105B, the laser beam circulating optical system 104B and the welding head 103B so as to improve laser welding quality.

In the present embodiment, the drive motor 15B for the optical condensing system is controlled so that the center axis of the laser beam always coincides with the center of the incidence window W; however, the drive motor 15B for the optical condensing system and an actuator, for example an electric motor, which is used for circulating the laser beam in the laser beam circulating optical system 104B, can be controlled in synchronism by a common output signal, or feed-back controlled by feeding back a rotational speed thereof.

In the above instance, since the rotating angles of the motors have to be determined and controlled in real time, output data from encoders which are transmitted and read in real time through such as an optical fiber can be used for the control of the motors.

FIG. 21(a), FIG. 21(b), FIG. 22(a) and FIG. 22(b) are views for explaining the operation of the tubular barrel supporting device 102B when the tubular barrels 1-A and 1-B are connected at the joint portion A.

Figures 21A, 21B:
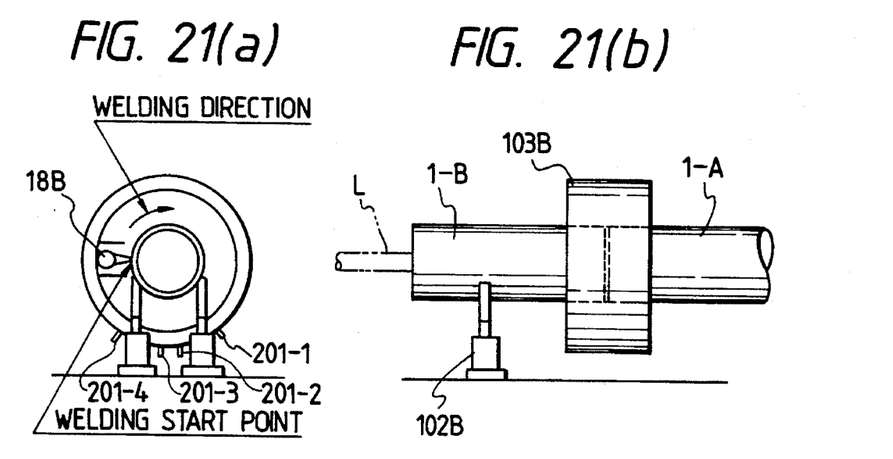
FIG. 21(a) is a side view of the laser welding devices shown in FIG. 18 and FIG. 19 illustrating one operating state of a tubular barrel supporting device incorporated therein.
FIG. 21(b) is a front view of the laser welding device shown in FIG. 21(a)
Figure 22A:
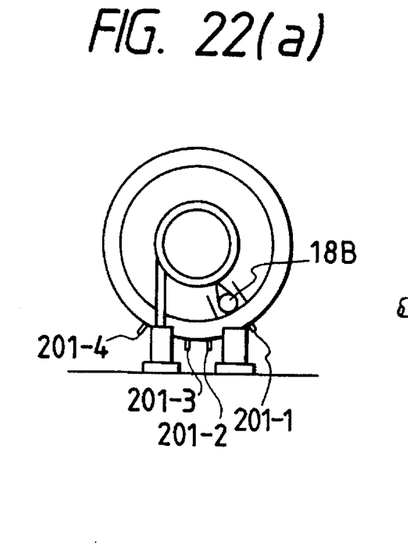
FIG. 22(a) is a side view of the laser welding devices shown in FIG. 18 and FIG. 19 illustrating another operating state of the tubular barrel supporting device shown in FIG. 21(a) and FIG. 21(b)
Figure 22B:
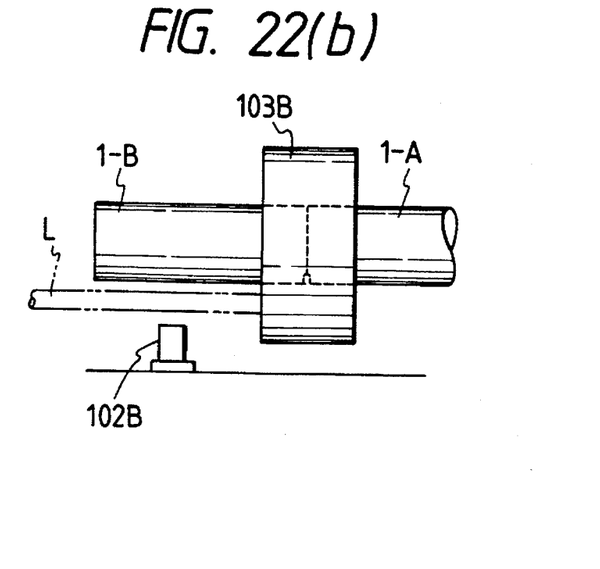
FIG. 22(b) is a front view of the laser welding device shown in FIG. 22(a)

FIG. 21(a) and FIG. 21(b) are respectively side and front views of the tubular barrel supporting device 102B illustrating a tubular barrel supporting state when the work head 18B in the rotating frame 10B is at its laser welding starting point, wherein position sensors 201-1, 201-2, 201-3 and 201-4 are provided around the outer circumferential guide 5B for detecting the position of the work head 18B in order to prevent interference between the laser beam and the tubular barrel supporting device 102B. FIG. 22(a) and FIG. 22(b) are respectively side and front views of the tubular barrel supporting device illustrating a tubular barrel supporting state when the work head 18B comes to a position between the position sensors 201-1 and 201-2 and one of the legs of the tubular barrel supporting device 102B is lowered to prevent interference between the laser beam and the tubular barrel supporting device 102B in response to position signals from the position sensors 201-1, 201-2, 201-3 and 201-4 to the control unit 101B. Another leg of the tubular barrel supporting device 102B is lowered when the work head 18B comes between the position sensors 201-3 and 201-4.

The tubular barrel supporting device 102B can be a hanging type or a direct or indirect gripping device making use of electromagnetic force, vacuum force or a previously attached supporting band.

Figure 23:
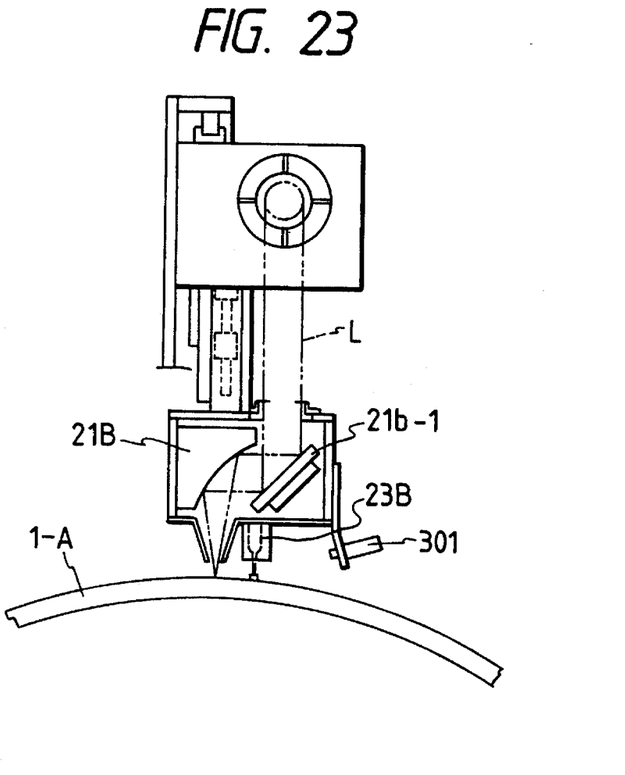
FIG. 23 is a cross-sectional view of a work head incorporated in the welding head shown in FIG. 20.

FIG. 23 is a view illustrating an example of the rotating frame 10B, wherein a parabolic mirror 21B is used in the condensing optical system for the work head 18B, the joint portion A is photographed with an industrial TV 301 and the position of the focus of the laser beam with respect to the joint portion A is corrected based on a processing in the control unit 101B by making use of the detected picture image signal.

According to the long-sized tubular grounding container unit of the present invention, a local airtight chamber is formed at the joint portion, so that the airtightness test can be performed easily and safely. Further, by means of the meshing geometries at the joint portion, no molten metals drop into the inside of the tubular container unit, which eliminates the need for finishing work after laser welding. Still further, through the laser welding, a high quality joint portion with few internal defects such as blow holes and pin holes is obtained.

According to the present laser welding device, which is suitable for constructing a long-sized tubular grounding container unit using a flexible optical waveguide (such as an optical fiber), alignment of the optical axes for transmitting the laser beam is facilitated. Where no flexible optical waveguide is used, the laser oscillator and the condensing optical system including the work head are mechanically separated from each other, and a high quality welded joint portion can be obtained regardless of the length of the tubular grounding container unit.

We claim:

1. A laser welding device for constructing a long-sized tubular grounding container unit by connecting tubular barrels, comprising:

a welding head disposed around respective facing ends of two tubular barrels arranged to be joined at the respective facing ends;

a work head, including condensing means disposed in said welding head for condensing a laser beam onto the respective facing ends for welding the respective facing ends to form a joint, said work head being arranged to rotate around an outer circumference of the welded tubular barrels at the joint;

a laser oscillator for generating a laser beam; and means for transmitting the laser beam from said laser oscillator to said condensing means in synchronism with the rotation of said work head;

wherein said laser beam transmitting means includes an optical fiber wound around one of the tubular barrels to permit extension of the optical fiber during rotation of said work head.

2. A laser welding device according to claim 1, wherein said laser beam transmitting means includes means for outputting the laser beam from said laser oscillator through said optical fiber towards the work head in a direction in parallel with the longitudinal axis of the tubular barrels, and means for receiving the parallel laser beam and then circulating the laser beam around the circumference of the tubular barrels in synchronism with the rotation of said work head.

3. A laser welding device according to claim 1, further comprising means for monitoring a dislocation of a laser beam focus point from the joint, and for correcting the position of said work head so as to eliminate the dislocation.

4. A laser welding device according to claim 1, further comprising means for monitoring a laser beam focus point with respect to the joint in a thickness direction of the jointed tubular barrels, and for controlling the position of said work head so that a distance between the laser beam focus point and the joint is maintained at a predetermined distance.

5. A laser welding device according to claim 1, wherein said work head includes a parabolic mirror for condensing the laser beam received from said laser beam transmitting means.

6. A laser welding device according to claim 1, further comprising means for adjusting an offset of the ends of the tubular barrels to be joined by laser welding before joining the ends in a laser welding operation, and for setting the respective positions of the tubular barrels in accordance with the adjusted offset.

7. A laser welding device according to claim 2, further comprising means for superposing a visible ray over the laser beam output from said laser beam outputting means.

8. A laser welding device according to claim 7, further comprising means for monitoring the intensity distribution of the visible ray superposed over the laser beam and for driving the work head based on the monitored distribution without regard to a configuration of the tubular barrels to be connected nor the output power of the laser beam.

9. A laser welding device according to claim 2, further comprising supporting means for supporting the tubular barrels to be connected, said supporting means being movable depending on the position of the work head to avoid interference with the laser beam transmitted from said laser beam outputting means to said laser beam receiving means.

* * * * *